(12) United States Patent
Benkhoff et al.

(10) Patent No.: US 6,756,487 B2
(45) Date of Patent: Jun. 29, 2004

(54) MONOAZOQUINOLONE PIGMENTS, PROCESS FOR THEIR PREPARATION AND THEIR USE

(75) Inventors: Johannes Benkhoff, Basel (CH); Olof Wallquist, Therwil (CH); Tetsuo Hyuga, Tokyo (JP); Gerardus De Keyzer, Riehen (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/399,441

(22) PCT Filed: Oct. 22, 2001

(86) PCT No.: PCT/EP01/12178

§ 371 (c)(1),
(2), (4) Date: Sep. 2, 2003

(87) PCT Pub. No.: WO02/34839

PCT Pub. Date: May 2, 2002

(65) Prior Publication Data

US 2004/0034204 A1 Feb. 19, 2004

(51) Int. Cl.$^7$ ............................ C09B 29/33; C09D 11/00; C08K 5/3437; G02B 5/22
(52) U.S. Cl. .................. 534/740; 106/31.48; 106/31.77; 106/196; 524/87; 347/106; 349/106
(58) Field of Search ..................... 534/740; 106/31.48, 106/31.77, 496; 524/87; 347/106; 349/106

(56) References Cited

U.S. PATENT DOCUMENTS

| | | | |
|---|---|---|---|
| 2,754,293 A | 7/1956 | Brody et al. | 260/155 |
| 3,119,808 A | 1/1964 | Buckley et al. | 260/155 |
| 3,137,685 A | 6/1964 | Buckley et al. | 260/155 |
| 4,220,586 A | 9/1980 | Cseh et al. | 260/157 |

*Primary Examiner*—Fiona T. Powers

(74) *Attorney, Agent, or Firm*—Tyler A. Stevenson

(57) ABSTRACT

Monoazoquilolone pigments which, in one of the tautomeric forms thereof, correspond to formula (1), wherein Ar is a radical of formula (2a), (2b), (2c), (2d), 2(e) or (2f) wherein $R_1$ is $C_1$–$C_4$alkyl, $R_2$ and $R_3$ are each independently of the other hydrogen, halogen, $C_1$–$C_4$alkyl, carboxy, sulfo, cyano, $C_1$–$C_4$alkoxycarbonal, $C_1$–$C_4$alkylcarbonyl, $C_1$–$C_4$alkanoylamino, benzoylamino that is unsubstituted or substituted in the phenyl ring by halogen, nitro, $C_1$–$C_4$alkyl or by $C_1$–$C_4$alkoxy; carbamoyl, N-$C_1$–$C_4$alkylaminocarbonyl, N-arylaminocarbonyl that is unsubstituted or substituted in the aryl moiety by halogen, nitro, $C_1$–$C_4$alkyl or by $C_1$–$C_4$alkoxy; N,N-di-$C_1$–$C_4$alkylaminocarbonyl, $C_1$–$C_4$alkoxysulfonyl, $C_1$–$C_4$alkylsulfonyl, sulfamoyl, N-$C_1$–$C_4$alkylaminosulfonyl, N-arylaminosulfonyl that is unsubstituted or substituted in the aryl moiety by halogen, nitro, $C_1$–$C_4$alkyl or by $C_1$–$C_4$alkoxy; or N,N-di-$C_1$–$C_4$alkylaminosulfonyl, wherein carboxy and sulfo are in the form of the free acid or in salt form, $R_8$ and $R_9$ are each independently of the other hydrogen, halogen, $C_1$–$C_4$alkyl, $C_1$–$C_4$alkoxy, carboxy, sulfo, cyano, $C_1$–$C_4$alkoxycarbonyl, $C_1$–$C_4$alkylcarbonyl, $C_1$–$C_4$alkanoylamino, benzoylamino that is unsubstituted or substituted in the phenyl ring by halogen, nitro, $C_1$–$C_4$alkyl or by $C_1$–$C_4$alkoxy; carbamoyl, N-$C_1$–$C_4$alkylaminocarbonyl, N-arylaminocarbonyl that is unsubstituted or substituted in the aryl moiety by halogen, nitro, $C_1$–$C_4$alkyl or $C_1$–$C_4$alkoxy, N,N-di-$C_1$–$C_4$-alkylaminocarbonyl, $C_1$–$C_4$alkoxysulfonyl, $C_1$–$C_4$alkylsulfonyl, sulfamoyl, N-$C_1$–$C_4$alkylaminosulfonyl, N-arylaminosulfonyl that is unsubstituted or substituted in the aryl moiety by halogen, nitro, $C_1$–$C_4$alkyl or by $C_1$–$C_4$alkoxy; or N,N-di-$C_1$–$C_4$alkylaminosulfonyl, wherein carboxy and sulfo are in the form of the free acid or in salt form. $Ar_1$ is an aryl radical, p is a number 0, 1 or 2, and r is a number 0, 1 or 2, wherein $(R_8)_r$ in formula (2f) denotes r identical or different radicals $R_8$, are suitable for the coloring of high molecular weight material and are distinguished by good fastness properties of the resulting colorations.

14 Claims, No Drawings

MONOAZOQUINOLONE PIGMENTS, PROCESS FOR THEIR PREPARATION AND THEIR USE

The present invention relates to novel monoazoquinolone pigments, to a process for their preparation, and to their use as colourants, especially for coloring high molecular weight material.

Monoazoquinolone pigments are known. For example, U.S. Pat. No. 3,119,808 discloses monoazoquinolone pigments containing neither sulfonic acid groups nor carboxylic acid groups at the coupling component.

The ever greater demands made of the quality of colourations, for example the fastness properties, or of application-related properties, for example the migration behaviour or the oversprayability, have resulted in there still being a need for new pigments that exhibit improved properties, especially with regard to fastness properties.

Accordingly, the object underlying the present invention is to find novel, improved monoazoquinolone pigments, especially for producing surface coatings, printing inks and colour filters or for the colouring of plastics, which pigments possess the above-characterised qualities to a high degree. The novel pigments should yield colourations having a high purity of shade, high tinctorial strength, and good fastness to overspraying and migration. The resulting colourations should especially exhibit good fastness to heat, light and weathering.

It has been found that the stated object is largely achieved with the novel monoazoquinolone pigments defined hereinbelow.

Accordingly, the present invention relates to monoazoquinolone pigments which, in one of the tautomeric forms thereof, correspond to the formula

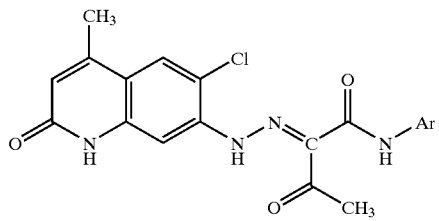

(1)

wherein

Ar is a radical of the formula

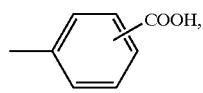

(2a)

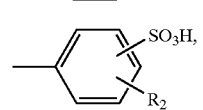

(2b)

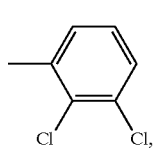

(2c)

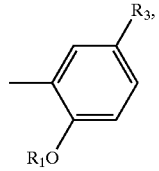

(2d)

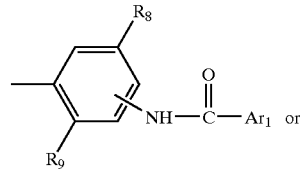

(2e)

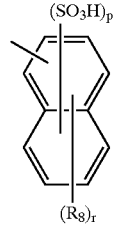

(2f)

wherein
  $R_1$ is $C_1$–$C_4$alkyl,
  $R_2$ and $R_3$ are each independently of the other hydrogen, halogen, $C_1$–$C_4$alkyl, carboxy, sulfo, cyano, $C_1$–$C_4$alkoxycarbonyl, $C_1$–$C_4$alkylcarbonyl, $C_1$–$C_4$alkanoylamino, benzoylamino that is unsubstituted or substituted in the phenyl ring by halogen, nitro, $C_1$–$C_4$alkyl or by $C_1$–$C_4$alkoxy; carbamoyl, N-$C_1$–$C_4$alkylaminocarbonyl, N-arylaminocarbonyl that is unsubstituted or substituted in the aryl moiety by halogen, nitro, $C_1$–$C_4$alkyl or by $C_1$–$C_4$-alkoxy; N,N-di-$C_1$–$C_4$alkylaminocarbonyl, $C_1$–$C_4$alkoxysulfonyl, $C_1$–$C_4$alkylsulfonyl, sulfamoyl, N-$C_1$–$C_4$alkylaminosulfonyl, N-arylaminosulfonyl that is unsubstituted or substituted in the aryl moiety by halogen, nitro, $C_1$–$C_4$alkyl or by $C_1$–$C_4$alkoxy; or N,N-di-$C_1$–$C_4$alkylaminosulfonyl,
  wherein carboxy and sulfo are in the form of the free acid or in salt form,
  $R_8$ and $R_9$ are each independently of the other hydrogen, halogen, $C_1$–$C_4$alkyl, $C_1$–$C_4$alkoxy, carboxy, sulfo, cyano, $C_1$–$C_4$alkoxycarbonyl, $C_1$–$C_4$alkylcarbonyl, $C_1$–$C_4$alkanoylamino, benzoylamino that is unsubstituted or substituted in the phenyl ring by halogen, nitro, $C_1$–$C_4$-alkyl or by $C_1$–$C_4$alkoxy; carbamoyl, N-$C_1$–$C_4$alkylaminocarbonyl, N-arylaminocarbonyl that is unsubstituted or substituted in the aryl moiety by halogen, nitro, $C_1$–$C_4$alkyl or by $C_1$–$C_4$-alkoxy; N,N-di-$C_1$–$C_4$alkylaminocarbonyl, $C_1$–$C_4$alkoxysulfonyl, $C_1$–$C_4$alkylsulfonyl, sulfamoyl, N-$C_1$–$C_4$alkylaminosulfonyl, N-arylaminosulfonyl that is unsubstituted or substituted in the aryl moiety by halogen, nitro, $C_1$–$C_4$alkyl or by $C_1$–$C_4$alkoxy; or N,N-di-$C_1$–$C_4$alkylaminosulfonyl,
  wherein carboxy and sulfo are in the form of the free acid or in salt form,
  $Ar_1$ is an aryl radical,
  p is a number 0, 1 or 2, and
  r is a number 0, 1 or 2, wherein $(R_8)_r$ in formula (2f) denotes r identical or different radicals $R_8$.

There come into consideration as $C_1$–$C_4$alkyl for $R_1$, $R_2$, $R_3$, $R_8$ and $R_9$ each independently of the others, for example, methyl, ethyl, n-propyl, isopropyl, n-butyl, sec-butyl, tert-butyl or isobutyl, preferably methyl or ethyl and especially methyl.

There come into consideration as $C_1$–$C_4$alkoxy for $R_8$ and $R_9$ each independently of the other, for example, methoxy, ethoxy, propoxy or butoxy.

There come into consideration as halogen for $R_2$, $R_3$, $R_8$ and $R_9$ each independently of the others, for example, fluorine, chlorine or bromine, preferably chlorine or bromine and especially chlorine.

There come into consideration as $C_1$–$C_4$alkanoylamino for $R_2$, $R_3$, $R_8$ and $R_9$ each independently of the others, for example, formylamino, acetylamino or propionylamino, especially acetylamino.

$R_2$, $R_3$, $R_8$ and $R_9$, each independently of the others, as benzoylamino are unsubstituted or substituted in the phenyl ring by halogen, for example chlorine or bromine, preferably chlorine; nitro; $C_1$–$C_4$alkyl, for example methyl, ethyl, n- or iso-propyl, n-, sec-, tert- or iso-butyl, preferably methyl or ethyl and especially methyl; or by $C_1$–$C_4$alkoxy, for example methoxy, ethoxy, n-propoxy, isopropoxy, n-butoxy or isobutoxy, preferably methoxy or ethoxy and especially methoxy.

There come into consideration as $C_1$–$C_4$alkoxycarbonyl for $R_2$, $R_3$, R8 and $R_9$ each independently of the others, for example, methoxy-, ethoxy-, n-propoxy-, isopropoxy- or n-butoxy-carbonyl, preferably methoxy- or ethoxy-carbonyl and especially methoxycarbonyl.

There come into consideration as $C_1$–$C_4$alkylcarbonyl for $R_2$, $R_3$, $R_8$ and $R_9$ each independently of the others, for example, acetyl, propionyl, butyroyl or valeroyl, preferably acetyl or propionyl and especially acetyl.

There come into consideration as N-$C_1$–$C_4$alkylaminocarbonyl for $R_2$, $R_3$, $R_8$ and $R_9$ each independently of the others, for example, N-methyl-, N-ethyl-, N-propyl-, N-isopropyl-, N-butyl-, N-sec-butyl- or N-isobutyl-aminocarbonyl, preferably N-methyl- or N-ethyl-amino-carbonyl and especially N-methylaminocarbonyl.

There come into consideration as N-arylaminocarbonyl for $R_2$, $R_3$, $R_8$ and $R_9$ each independently of the others, for example, N-phenyl- or N-naphthyl-aminocarbonyl, preferably N-phenylaminocarbonyl. The mentioned radicals are unsubstituted or substituted in the aryl moiety by halogen, for example chlorine or bromine, preferably chlorine; nitro; $C_1$–$C_4$alkyl, for example methyl, ethyl, n- or iso-propyl, n-, sec-, tert- or iso-butyl, preferably methyl or ethyl and especially methyl; or by $C_1$–$C_4$alkoxy, for example methoxy, ethoxy, n-propoxy, isopropoxy, n-butoxy or isobutoxy, preferably methoxy or ethoxy and especially methoxy.

There come into consideration as N,N-di-$C_1$–$C_4$alkyl-aminocarbonyl for $R_2$, $R_3$, $R_8$ and $R_9$ each independently of the others, for example, N,N-di-methyl-, N,N-di-ethyl-, N-methyl-N-ethyl-, N,N-di-propyl-, N,N-di-isopropyl-, N,N-di-butyl-, N,N-di-sec-butyl-, N-methyl-N-sec-butyl- or N,N-di-isobutyl-aminocarbonyl, preferably N,N-di-methyl- or N,N-di-ethyl-aminocarbonyl and especially N,N-di-methylaminocarbonyl.

There come into consideration as $C_1$–$C_4$alkoxysulfonyl for $R_2$, $R_3$, $R_8$ and $R_9$ each independently of the others, for example, methoxy-, ethoxy-, n-propoxy-, isopropoxy- or n-butoxy-sulfonyl, preferably methoxy- or ethoxy-sulfonyl and especially methoxysulfonyl.

There come into consideration as $C_1$–$C_4$alkylsulfonyl for $R_2$, $R_3$, R8 and $R_9$ each independently of the others, for example, methyl-, ethyl-, n-propyl-, isopropyl-, n-butyl-, sec-butyl-, tert-butyl- or isobutyl-sulfonyl, preferably methyl- or ethyl-sulfonyl and especially methylsulfonyl.

There come into consideration as N-$C_1$–$C_4$alkylamino-sulfonyl for $R_2$, $R_3$, R8 and $R_9$ each independently of the others, for example, N-methyl-, N-ethyl-, N-propyl-, N-isopropyl-, N-butyl-, N-sec-butyl-, N-tert-butyl- or N-isobutyl-aminosulfonyl, preferably N-methyl- or N-ethyl-aminosulfonyl and especially N-methylaminosulfonyl.

There come into consideration as N-arylaminosulfonyl for $R_2$, $R_3$, $R_8$ and $R_9$ each independently of the others, for example, N-phenyl- or N-naphthyl-aminosulfonyl, preferably N-phenylaminosulfonyl. The mentioned radicals are unsubstituted or substituted in the aryl moiety by halogen, for example chlorine or bromine, preferably chlorine; nitro; $C_1$–$C_4$alkyl, for example methyl, ethyl, n- or iso-propyl, n-, sec-, tert- or iso-butyl, preferably methyl or ethyl and especially methyl; or by $C_1$–$C_4$alkoxy, for example methoxy, ethoxy, n-propoxy, isopropoxy, n-butoxy or isobutoxy, preferably methoxy or ethoxy and especially methoxy.

There come into consideration as N,N-di-$C_1$–$C_4$alkylaminosulfonyl for $R_2$, $R_3$, $R_8$ and $R_9$ each independently of the others, for example, N,N-di-methyl-, N,N-di-ethyl-, N-methyl-N-ethyl-, N,N-di-propyl-, N,N-di-isopropyl-, N,N-di-butyl-, N,N-di-sec-butyl-, N-methyl-N-sec-butyl- or N,N-di-isobutyl-aminosulfonyl, preferably N,N-di-methyl- or N,N-di-ethyl-aminosulfonyl and especially N,N-di-methylaminosulfonyl.

$Ar_1$ as an aryl radical is preferably a phenyl or naphthyl radical, those radicals being unsubstituted or substituted by one or more substituents $R_8$.

The carboxy and sulfo groups in the radicals of formulae (2a) and (2b) are bonded in the 2-, 3- or 4-position, preferably in the 4-position.

There come into consideration as carboxy and sulfo in the radicals of formulae (2a) and (2b) and for $R_2$, $R_3$, $R_8$ and $R_9$ both the free acid and their salts, for example the alkali metal, alkaline earth metal, transition metal or ammonium salts, salts of an organic amine, or mixtures thereof.

The present invention accordingly relates also to pigments of formula (1) wherein carboxy groups and sulfo groups are in salt form.

Examples of suitable alkali metal, alkaline earth metal or transition metal salts which may be mentioned are lithium, sodium, potassium, magnesium, calcium, strontium, barium, copper(I), copper(II), zinc(II), manganese(II) or aluminium (III) salts, preferably sodium, magnesium, calcium, strontium or barium salts.

Suitable salts of an organic amine or suitable ammonium salts contain, for example, cations of the formula

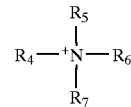

wherein $R_4$, $R_5$, $R_6$ and $R_7$ are each independently of the others hydrogen, $C_1$–$C_6$alkyl, for example methyl, ethyl, n-propyl, n-butyl or n-pentyl, or phenyl or benzyl each of which is unsubstituted or substituted in the phenyl ring by $C_1$–$C_4$alkyl, for example methyl or ethyl, $C_1$–$C_4$alkoxy, for example methoxy or ethoxy, halogen, for example chlorine or bromine, nitro, amino, N-$C_1$–$C_4$alkylamino, for example N-methylamino or N-ethylamino, or by N,N-di-$C_1$–$C_4$alkylamino, for example N,N-di-methylamino or N,N-di-ethyl-amino. The following salts may be mentioned by way of example: the tetramethylammonium salt, the salt of mono-, di- or tri-methylamine or mono-, di- or tri-ethylamine, of benzylamine, of benzylamine monosubstituted in the phenyl ring by methyl, methoxy, chlorine or by nitro, of aniline, of N-methylaniline or of N,N-dimethylaniline.

The alkali metal, alkaline earth metal or transition metal salts of the pigments according to the invention are obtained, for example, by reaction of the pigments of formula (1) wherein the radical Ar contains carboxy and/or sulfo in the form of the free acid, with an alkali metal salt, alkaline earth metal salt or transition metal salt of an organic or inorganic acid, for example of acetic acid, carbonic acid, hydrochloric acid, nitric acid or sulfuric acid, by conventional processes.

The ammonium salts or the salts of an organic amine of the pigments according to the invention are obtained, for example, by reaction of the pigments of formula (1) according to the invention wherein the radical Ar contains carboxy and/or sulfo in the form of the free acid, with the corresponding amines by conventional processes.

Carboxy in the radical of formula (2a) and for $R_2$ and $R_3$ is preferably in the form of the free acid.

Sulfo in the radical of formula (2b) and for $R_2$ and $R_3$ is preferably in the form of the sodium, barium or calcium salt, especially the calcium salt.

$R_1$ is preferably methyl or ethyl, especially methyl.

$R_2$ is preferably hydrogen, halogen, $C_1$–$C_4$alkyl, cyano, $C_1$–$C_4$alkoxycarbonyl, $C_1$–$C_4$alkyl-carbonyl, $C_{1-4}$alkanoylamino, benzoylamino that is unsubstituted or substituted in the phenyl ring by halogen, nitro, $C_1$–$C_4$alkyl or by $C_1$–$C_4$alkoxy; carbamoyl, N-$C_1$–$C_4$alkylaminocarbonyl, N-arylaminocarbonyl that is unsubstituted or substituted in the aryl moiety by halogen, nitro, $C_1$–$C_4$alkyl or by $C_1$–$C_4$alkoxy; N,N-di-$C_1$–$C_4$alkylaminocarbonyl, $C_1$–$C_4$alkoxy-sulfonyl, $C_1$–$C_4$alkylsulfonyl, sulfamoyl, N-$C_1$–$C_4$alkylaminosulfonyl, N-arylaminosulfonyl that is unsubstituted or substituted in the aryl moiety by halogen, nitro, $C_1$–$C_4$alkyl or by $C_1$–$C_4$-alkoxy; or N,N-di-$C_1$–$C_4$alkylaminosulfonyl.

$R_2$ is particularly preferably hydrogen, halogen, $C_1$–$C_4$alkyl, $C_1$–$C_4$alkanoylamino, benzoyl-amino that is unsubstituted or substituted in the phenyl ring by halogen, nitro, $C_1$–$C_4$alkyl or by $C_1$–$C_4$alkoxy, and especially hydrogen.

$R_3$ is preferably hydrogen, halogen, $C_1$–$C_4$alkyl, carboxy, sulfo, cyano, $C_1$–$C_4$alkoxycarbonyl, $C_1$–$C_4$alkylcarbonyl, carbamoyl, N-$C_1$–$C_4$alkylaminocarbonyl, N-arylaminocarbonyl that is unsubstituted or substituted in the aryl moiety by halogen, nitro, $C_1$–$C_4$alkyl or by $C_1$–$C_4$-alkoxy; N,N-di-$C_1$–$C_4$alkylaminocarbonyl, $C_1$–$C_4$alkoxysulfonyl, $C_1$–$C_4$alkylsulfonyl, sulfamoyl, N-$C_1$–$C_4$alkylaminosulfonyl, N-arylaminosulfonyl that is unsubstituted or substituted in the aryl moiety by halogen, nitro, $C_1$–$C_4$alkyl or by $C_1$–$C_4$alkoxy; or N,N-di-$C_1$–$C_4$alkylaminosulfonyl.

$R_3$ is particularly preferably hydrogen, halogen, $C_1$–$C_4$alkyl, carboxy, sulfo, cyano, $C_1$–$C_4$-alkoxycarbonyl or carbamoyl.

$R_3$ is most particularly preferably hydrogen, chlorine, methyl, carboxy, sulfo, methoxy-carbonyl or carbamoyl, preferably carboxy, sulfo or carbamoyl and especially carboxy.

In a preferred embodiment of the monoazoquinolone pigments according to the invention,
$R_1$ is methyl and
$R_3$ is hydrogen, chlorine, methyl, carboxy, sulfo or methoxycarbonyl, preferably carboxy, sulfo or carbamoyl and especially carboxy.

Ar is preferably a radical of formula (2a), (2b), (2c) or (2d).

Ar is particularly preferably a radical of formula (2a), (2b) or (2d), preferably of formula (2a) or (2d) and especially of formula (2d).

The present invention relates also to a process for the preparation of monoazoquinolone pigments of formula (1), wherein a compound of the formula

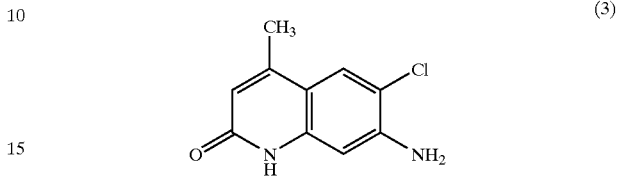

(3)

is diazotised and coupled to a compound of the formula

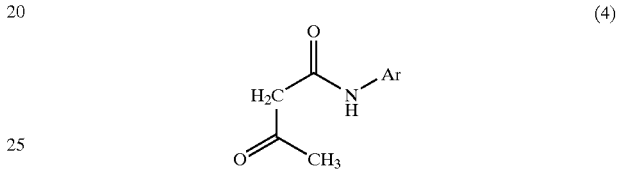

(4)

wherein Ar has the definitions and preferred meanings mentioned above.

The diazotisation of the compound of formula (3) is carried out, for example, using a nitrite, for example using an alkali metal nitrite, such as sodium nitrite, in a mineral-acid medium, for example in a hydrochloric acid medium, at temperatures of, for example, from −5 to 40° C. and preferably at from −5 to 10° C.

The coupling to the coupling component of formula (4) is carried out in a manner known per se at acid, neutral to weakly alkaline pH values, for example at a pH value of from 1 to 10, and at temperatures of, for example, from −5 to 40° C., preferably from 0 to 30° C.

The process according to the invention is advantageously carried out by slowly adding a freshly prepared solution or suspension of the diazotised compound of formula (3) to a weakly acid to neutral solution or suspension of the acetoacetanilide coupling component of formula (4), the pH being maintained in the neutral range, for example at pH 4.5 to 8, by addition of an aqueous alkali hydroxide solution, for example a sodium hydroxide solution, subsequently stirring the resulting pigment suspension until the reaction is complete, and isolating the product by filtration.

The compound of formula (3) is known and can be obtained, for example, according to the process described in U.S. Pat. No. 3,119,808. The compounds of formula (4) are known or can be obtained by processes known per se.

The monoazoquinolone pigments of formula (1) according to the invention are suitable as colourants for colouring high molecular weight material.

The high molecular weight material can be organic or inorganic and may be a synthetic and/or natural material. It may be, for example, natural resins or drying oils, rubber or casein, or modified natural materials such as chlorinated rubber, oil-modified alkyd resins, viscose, cellulose ethers or esters, such as ethyl cellulose, cellulose acetate, propionate or butyrate, cellulose acetobutyrate as well as nitrocellulose, but especially totally synthetic organic polymers (thermosetting plastics and thermoplastics), as can be obtained by polymerisation, for example by polycondensation or polyaddition. The polymer class includes, for example, polyolefins, such as polyethylene, polypropylene, polyisobutylene, also substituted polyolefins, such as polymerisation products of monomers such as vinyl chloride, vinyl acetate, styrene, acrylonitrile, acrylic acid esters, methacrylic acid esters; fluoropolymers, for example polyfluoroethylene, polytrifluorochloroethylene or tetrafluoroethylene/hexafluoropropylene mixed polymers, as well as copolymers of the mentioned monomers, especially ABS (acrylonitrile/butadiene/styrene) or EVA (ethylene/vinyl acetate). From the group of the polyaddition and polycondensation resins it is possible to use, for example, condensation products of formaldehyde with phenols, the so-called phenoplasts, and condensation products of formaldehyde and urea or thiourea, and also melamine, the so-called amino-plasts, also the polyesters used as surface-coating resins, either saturated, such as alkyd resins, or unsaturated, such as maleic resins, also linear polyesters, polyamides, polyurethanes, polycarbonates, polyphenylene oxides or silicones, and silicone resins.

The mentioned high molecular weight compounds may be present individually or in mixtures, in the form of plastic compositions or melts, which may optionally be spun to form fibres.

They may also be present in the form of their monomers or in the polymerised state in dissolved form as film-forming agents or binders for surface coatings, paints or printing inks, such as boiled linseed oil, nitrocellulose, alkyd resins, melamine resins, urea-formaldehyde resins or acrylic resins.

Pigmenting of the high molecular weight organic materials with the monoazoquinolone pigments according to the invention is carried out, for example, by adding such a pigment, optionally in the form of a masterbatch, to the substrates using rolling mills, mixing or grinding apparatuses. The pigmented material is then generally brought into the desired final form by methods known per se, such as calendering, compression moulding, extrusion, spread-coating, casting or by injection moulding. It is often desirable, in order to produce non-rigid mouldings or to reduce their brittleness, to incorporate so-called plasticisers into the high molecular weight compounds before they are shaped. There may be used as plasticisers, for example, esters of phosphoric acid, phthalic acid or sebacic acid. The plasticisers may be incorporated in the process according to the invention before or after the incorporation of the pigment colourant into the polymers. It is also possible, in order to achieve different shades of colour, to add to the high molecular weight organic materials, in addition to the monoazoquinolone pigments of formula (1), also fillers or other constituents imparting colour, such as white, coloured or black pigments as well as special-effect pigments, in each case in the desired amount.

For the pigmenting of surface coatings and printing inks, the high molecular weight organic materials and the monoazoquinolone pigments of formula (1), optionally together with additives such as fillers, other pigments, for example $TiO_2$, siccatives or plasticisers, are generally finely dispersed or dissolved in an organic and/or aqueous solvent or solvent mixture. The procedure may be such that the individual components are dispersed or dissolved separately or several are dispersed or dissolved together, and only then are all the components combined.

Based on the high molecular weight material to be pigmented, the monoazoquinolone pigments according to the invention can be used in an amount of from 0.01 to 30% by weight, preferably from 0.1 to 10% by weight.

Accordingly, the present invention relates also to the use of the monoazoquinolone pigments of formula (1) according to the invention in the colouring of high molecular weight material, especially organic high molecular weight material, which includes the use as a colourant for plastics in any form, for example in the form of fibres, surface coatings or printing inks.

The monoazoquinolone pigments of formula (1) according to the invention are especially suitable for the colouring, in the mass, of polyvinyl chloride and, especially, polyolefins, such as polyethylene and polypropylene, as well as of aqueous and/or solvent-based lacquers, for example automotive lacquers, also powder coatings, printing inks and paints.

The resulting colourants, for example in plastics, fibres, surface coatings or prints, are distinguished by a high purity of shade, high tinctorial strength, good fastness to overspraying and migration, and especially by good fastness to heat, light and weathering, for example in full-shade or reduction with white applications.

The monoazoquinolone pigments of formula (1) according to the invention are further distinguished by good dispersibility, good rheological behaviour and a high gloss of the colourants obtained therewith.

It is assumed that the advantageous properties of the pigments according to the invention are attributable to the specific choice of substituents and the substitution pattern at the phenyl radical Ar.

The monoazoquinolone pigments of formula (1) according to the invention are also suitable as colourants for the production of colour filters, especially for visible light in the range from 400 to 700 nm, for liquid crystal displays (LCD) or charge combined devices (CCD). The monoazoquinolone pigments of formula (1) can be used alone or in combination with suitable red, blue and/or green pigments.

The production of colour filters by the sequential application of a red, blue and green pigment to a suitable substrate, for example amorphous silicon, is described in GB-A 2 182 165. The colour filters can be coated, for example, using inks, especially printing inks, comprising the monoazoquinolone pigments according to the invention, or, for example, by mixing the monoazoquinolone pigments according to the invention with chemically, thermally or photolytically structurable high molecular weight material. The further production can be carried out, for example, analogously to EP-A 654 711 by application to a substrate, such as an LCD, subsequent photostructuring and development. A further document which describes the production of colour filters is U.S. Pat. No. 5,624,467.

The colour filters produced with the pigments according to the invention for liquid crystal displays (LCD) exhibit an improved transmission window between 500 and 600 nm in comparison with colour filters known hitherto, and they are therefore distinguished by high transmission of the green colour points. The colour filters produced with the pigments according to the invention have increased absorption at 400 nm in comparison with the colour filters known hitherto, which advantageously yields a more yellowish green.

The Examples which follow serve to illustrate the invention.

EXAMPLE 1

28 ml of 37% hydrochloric acid are added dropwise, with stirring, at 5° C., to a suspension of 120 ml of glacial acetic acid, 200 ml of water and 16.68 g of 7-amino-6-chloro-4-methylquinolin-2-one (80 mmol). 20 ml (80 mmol) of an aqueous 4N sodium nitrite solution are then added dropwise at that temperature to the greenish-white suspension, and stirring is carried out for 90 minutes, during which the suspension slowly changes into a golden yellow solution. The cold solution is clarified by filtration over a glass frit, the residue is washed with 2×30 ml of water, and the collected filtrate is transferred to a dropping funnel containing 100 g of ice.

16.56 g (80 mmol) of acetoacet-2-anisidide are dissolved in 200 ml of water with addition of 10 ml (100 mmol) of 30% aqueous sodium hydroxide solution. The colourless solution is clarified by filtration, and the anisidide is then freshly precipitated with 30% aqueous acetic acid solution with vigorous stirring, and the resulting white suspension is adjusted to pH 4.5.

The ice-cold, golden yellow solution of the diazonium salt is added dropwise in the course of 30 minutes, with vigorous stirring, to the suspension of acetoacet-2-anisidide, which has been adjusted to a temperature of from 5 to 10° C. pH balancing is effected by means of the simultaneous addition of 30% aqueous sodium hydroxide solution. The golden yellow pigment suspension is first stirred for 30 minutes at from 5 to 10° C. and then heated to 90° C., and the yellow pigment is filtered off while hot, washed with copious amounts of water until neutral and free of salt, and dried for 20 hours at 110° C. under a laboratory vacuum. There are obtained 31.5 g (73.8 mmol) of a pigment of the formula

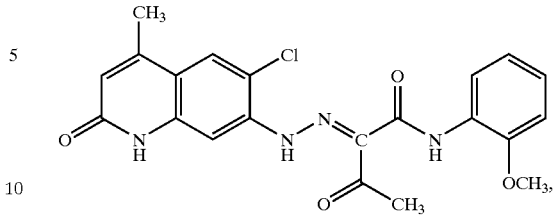

(101)

which in high molecular weight organic material yields greenish-yellow colourations having very good fastness to weathering.

EXAMPLES 2 to 12

Analogously to the procedure described in Example 1 it is possible to obtain the pigments of the formula

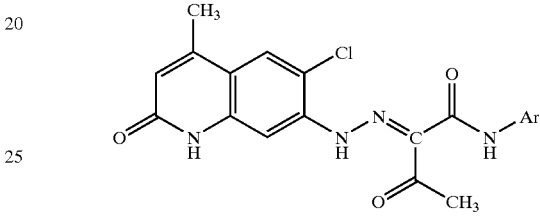

wherein Ar has the meanings given in Table 1, if an equimolar amount of one of the acetoacetanilides indicated in Table 1 is used instead of 16.56 g (80 mmol) of acetoacet-2-anisidide. The pigments yield colourations in high molecular weight organic material in the shade indicated in each case and with very good fastness to weathering.

TABLE 1

| Example | Acetoacetanilide | Ar | Shade |
|---|---|---|---|
| 2 | ![structure with OC2H5] | ![structure with OC2H5] | greenish-yellow |
| 3 | ![structure with COOH] | ![structure with COOH] | greenish-yellow |
| 4 | ![structure with COOH, OCH3] | ![structure with COOH, OCH3] | greenish-yellow |

TABLE 1-continued

| Example | Acetoacetanilide | Ar | Shade |
|---|---|---|---|
| 5 | 5-chloro-2-methoxy acetoacetanilide | 4-chloro-2-methyl-1-methoxybenzene | greenish-yellow |
| 6 | 5-methyl-2-methoxy acetoacetanilide | 4-methyl-2-methyl-1-methoxybenzene | greenish-yellow |
| 7 | 5-methoxycarbonyl-2-methoxy acetoacetanilide | 4-methoxycarbonyl-2-methyl-1-methoxybenzene | greenish-yellow |
| 8 | 5-carbamoyl-2-methoxy acetoacetanilide | 4-carbamoyl-2-methyl-1-methoxybenzene | greenish-yellow |
| 9 | 2,3-dichloro acetoacetanilide | 2,3-dichloro-1-methylbenzene | greenish-yellow |
| 10 | 5-sulfo-2-methoxy acetoacetanilide | 4-($SO_3Na$)-2-methyl-1-methoxybenzene | greenish-yellow |
| 11 | 5-sulfo-2-methoxy acetoacetanilide | 3-amino-4-methoxy-($SO_3Ca_{0.5}$)benzene | greenish-yellow |

TABLE 1-continued

| Example | Acetoacetanilide | Ar | Shade |
|---------|------------------|-----|-------|
| 12 | 4-sulfophenyl acetoacetanilide | 4-methylphenyl-SO₃Ca₀.₅ | greenish-yellow |
| 13 | 5-acetamido-2-methoxyphenyl acetoacetanilide | 4-acetamido-2-methyl-phenyl-OCH₃ | greenish-yellow |
| 14 | 4-(4-chlorobenzamido)phenyl acetoacetanilide | N-methyl-4-chlorobenzamide | yellow |
| 15 | 2-chloro-4-benzamido-5-methoxyphenyl acetoacetanilide | 2-chloro-4-benzamido-5-methoxybiphenyl | yellow |
| 16 | 1-sulfo-2-naphthyl acetoacetanilide | 1-SO₃Na-2-methylnaphthyl | greenish-yellow |
| 17 | 1-sulfo-2-naphthyl acetoacetanilide | 1-SO₃Ca₀.₅-2-methylnaphthyl | greenish-yellow |
| 18 | 4-sulfo-1-naphthyl acetoacetanilide | 4-SO₃Na-1-methylnaphthyl | greenish-yellow |

TABLE 1-continued

| Example | Acetoacetanilide | Ar | Shade |
|---|---|---|---|
| 19 | H₂C(=O)-C(=O)CH₃ attached via NH to naphthalene with SO₃H | methylnaphthalene with SO₃Ca₀.₅ | greenish-yellow |
| 20 | acetoacetanilide-naphthalene with SO₃H and OCH₃ | methylnaphthalene with SO₃Na and OCH₃ | greenish-yellow |
| 21 | acetoacetanilide-naphthalene with SO₃H and OCH₃ | methylnaphthalene with SO₃Ca₀.₅ and OCH₃ | greenish-yellow |

APPLICATION EXAMPLE 1
Use in the Colouring, in the Mass, of Plastics 0.6 g of the pigment obtained according to Example 1 is mixed with 67 g of polyvinyl chloride, 33 g of dioctyl phthalate, 2 g of dibutyltin dilaurate and 2 g of titanium dioxide and processed to a thin film on a roller apparatus for 15 minutes at 160° C. The yellow PVC film so obtained is tinctorially strong and fast to light.

APPLICATION EXAMPLE 2
Use in an Alkyd-melamine Stoving Lacquer

A mixture of 460 g of steatite spheres having a diameter of 8 mm, an alkyd lacquer consisting of 58.7 g of alkyd resin ®Alkydal F 310 (Bayer AG), 60% in xylene, 58.7 g of alkyd resin ®Alkydal F 32 (Bayer AG), 60% in xylene, 2.0 g of ®Silikonöl A (Bayer AG), 1% in xylene, 4.0 g of n-butanol, 4.0 g of Dowanol, 15 g of xylene, 5.6 g of dispersing agent ®Disperbyk D-160 (BYK-Chemie) and also 28.0 g of the pigment prepared according to Example 1 is dispersed in a glass bottle having a twist-off cap for 72 hours on a tumbler.

After addition of 24.0 g of the melamine component ®Cymel 327 (Cyanamid), 90% in xylene, dispersion is continued for a further one hour on the tumbler. The steatite spheres are then separated off. The resulting colour lake paste is applied to ®Milar transparency films and then stoved for 30 minutes at 130° C. (lacquer layer thickness 50 μm). A colouration having excellent coloristic and rheological properties is obtained.

APPLICATION EXAMPLE 3
Preparation of an Intaglio/Flexographic Printing Ink 15 g of the pigment from Example 1
20 g of clear lacquer consisting of
20 g of nitrocellulose type A
4 g of dioctyl phthalate
56 g of ethanol and
20 g of ethyl acetate and
25 g of ethanol are dispersed for 30 minutes by means of a high-speed stirrer (dissolver at 15 m/s). 40 g of the clear lacquer described above are then added to the batch, and dispersion is carried out for a further 5 minutes with the dissolver. The grinding charge is introduced into a bead mill by means of a pump with coarse filtering, and is finely dispersed therein. Extraordinary transparency/gloss properties are obtained with that printing ink both in intaglio/flexographic printing and in offset printing.

APPLICATION EXAMPLE 4
Production of a Colour Filter for Liquid Crystal Displays (LCD)

In a 100 ml glass vessel containing 83.3 g of zircon ceramic spheres, 2.8 g of the product according to Example 1, 0.28 g of Solsperse® 5000, 4.10 g of Disperbyk® 161

(dispersing agent, 30% solution of a high molecular weight block copolymer containing groups having affinity for pigments, in n-butyl acetate/1-methoxy-2-propyl acetate 1:6, BYK Chemie) and 14.62 g of propylene glycol monomethyl ether acetate (MPA, CAS Reg. No. 108-65-6) are stirred by means of a Dispermat for 10 minutes at 1000 rev./min. and for 180 minutes at 3000 rev./min. at 23° C. After addition of 4.01 g of an acrylate polymer binder (35% solution in MPA), stirring is carried out for 30 minutes at 3000 rev./min. at room temperature. After separation of the spheres, the dispersion is diluted with the same weight of MPA.

A glass substrate (Corning type 1737-F) is coated with that dispersion on a centrifugal lacquer coating apparatus and centrifuged off for 30 seconds at 1000 rev./min. Drying of the layer is carried out for 2 minutes at 100° C. and for 5 minutes at 200° C. on a hotplate. The layer thickness achieved is 0.4 μm.

APPLICATION EXAMPLE 5

A mixture of 1.0 g of the pigment prepared according to Example 1, 1.0 g of a commercially available antioxidant (®Irganox1010, Ciba Specialty Chemicals AG) and 1000 g of polyethylene HD granules (®Vestolen 60-16, Huels) is pre-mixed for 15 minutes in a glass bottle on a roller bench. The mixture is then extruded on a single-screw extruder in two passes, and the granules so obtained are compressed to sheets on an injection-moulding machine (Ferromatik Aarburg 200) for 5 minutes at 200° C., 5 minutes at 240° C., 5 minutes at 260° C., 5 minutes at 280° C. and 5 minutes at 300° C.

The sheets exhibit tinctorially strong yellow shades with good resistance properties.

APPLICATION EXAMPLE 6

1000 g of the pigment of formula

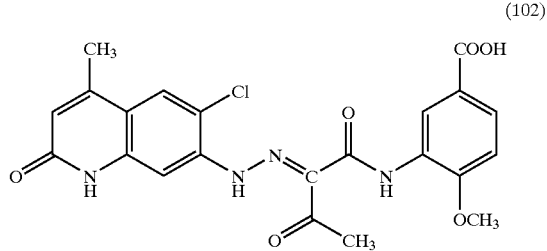

(102)

and 4000 g of a milled sodium chloride were mixed in a Henschel mixer for 1 hour at 3200 rpm.

APPLICATION EXAMPLE 7

1000 g of the pigment of formula

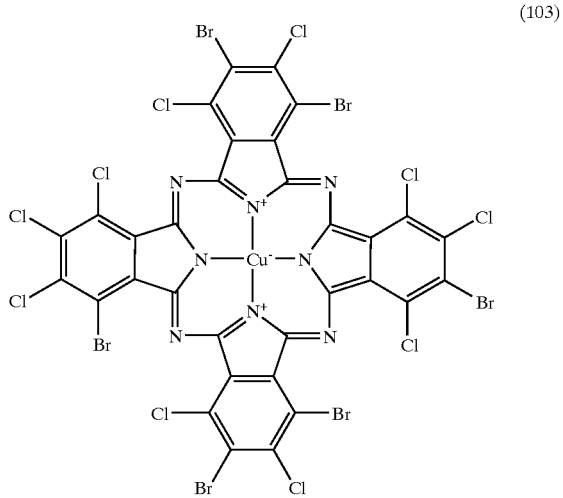

(103)

and 4000 g of a milled sodium chloride were mixed in a Henschel mixer for 1 hour at 3200 rpm.

APPLICATION EXAMPLE 8

A laboratory kneader with a capacity of 1 liter is charged with 42.0 g of the pigment of formula (103), 90.0 g of the mixture of Application Example 6, 1.168 g of sodium chloride and 70.0 ml of diacetone alcohol and the rotary speed is set to 100 rpm. The walls of the kneader are cooled to 30° C. so that the temperature in the mass does not exceed 40–45° C. After 8 hours, 150 ml of deionized water are added slowly, the resulting mixture is discharged onto a Büchner funnel and the material in the funnel is washed with water until the washing water is salt-free.

The product is dried at 80° C./3.10$^3$ Pa for 15 hours, then sieved through a sieve with a mesh size of 0.4 mm.

APPLICATION EXAMPLE 9

The procedure as given in Application Example 8 is repeated, but instead of 42.0 g of the pigment of formula (103) 210.0 g of the mixture of Application Example 7 is used.

APPLICATION EXAMPLE 10

In a 100 ml glass vessel containing 78.3 g of zircon ceramic beads, 2.52 g of the product of Application Example 8, 0.28 g of Solsperse® 22'000 (Avecia), 0.56 g of Solsperse® 24'000 (Avecia) and 12.65 g of propylene glycol monomethyl ether acetate (MPA), these components are stirred at 20° C. with a Dispermat at 1000 rpm for 10 minutes and at 3000 rpm for 180 minutes. Following the addition of 5.45 g of acrylic polymere binder (35% solution by weight in MPA) at room temperature and stirring is continued at 3000 rpm for 30 minutes. After the beads have been separated off, the dispersion is diluted with an equal amount of MPA. A glass substrate (Corning Type 1737-F) is coated with this dispersion in a spin-coating apparatus and is spun at 1000 rpm for 30 seconds. The drying of the coat is carried out at 100° for 2 minutes and at 200° C. for 5 minutes on a hotplate. The coat thickness achieved is 0.284 μm.

APPLICATION EXAMPLE 11

The prozedure as given in Application Example 10 is repeated, but instead of 2.52 g of the product of Application Example 8 the same amount of the product of Application Example 9 is used.

APPLICATION EXAMPLE 12

1000 g of the pigment of formula

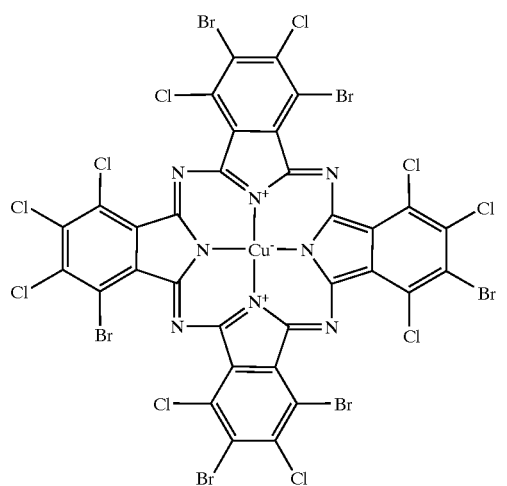

(104)

and 4000 g of a milled sodium chloride were mixed in a Henschel mixer for 1 hour at 3200 rpm.

APPLICATION EXAMPLE 13

A laboratory kneader with a capacity of 1 liter is charged with 42.0 g of the pigment of formula (104), 90.0 g of the mixture of Application Example 6, 1.168 g of sodium chloride and 70.0 ml of diacetone alcohol and the rotary speed is set to 100 rpm. The walls of the kneader are cooled to 30° C. so that the temperature in the mass does not exceed 40–45° C. After 8 hours, 150 ml of deionized water are added slowly, the resulting mixture is discharged onto a Büchner funnel and the material in the funnel is washed with water until the washing water is salt-free.

The product is dried at 80° C./$3.10^3$ Pa for 15 hours, then sieved through a sieve with a mesh size of 0.4 mm.

APPLICATION EXAMPLE 14

The procedure as given in Application Example 13 is repeated, but instead of 42.0 g of the pigment of formula (104) 210.0 g of the mixture of Application Example 12 is used.

APPLICATION EXAMPLE 15

In a 100 ml glass vessel containing 78.3 g of zircon ceramic beads, 2.52 g of the product of Application Example 13, 0.28 g of Solsperse® 22'000 (Avecia), 0.56 g of Solsperse® 24'000 (Avecia) and 12.65 g of propylene glycol monomethyl ether acetate (MPA), these components are stirred at 20° C. with a Dispermat at 1000 rpm for 10 minutes and at 3000 rpm for 180 minutes. Following the addition of 5.45 g of acrylic polymere binder (35% solution by weight in MPA) at room temperature and stirring is continued at 3000 rpm for 30 minutes. After the beads have been separated off, the dispersion is diluted with an equal amount of MPA. A glass substrate (Corning Type 1737-F) is coated with this dispersion in a spin-coating apparatus and is spun at 1000 rpm for 30 seconds. The drying of the coat is carried out at 100° C. for 2 minutes and at 200° C. for 5 minutes on a hotplate. The coat thickness achieved is 0.284 μm.

APPLICATION EXAMPLE 16

The procedure as given in Application Example 15 is repeated, but instead of 2.52 g of the product of Application Example 13 the same amount of the product of Application Example 14 is used.

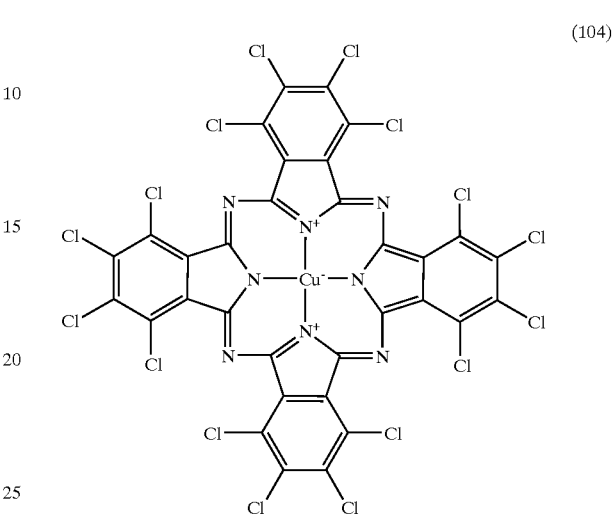

(104)

What is claimed is:

1. A monoazoquinolone pigment which, in one of the tautomeric forms thereof, corresponds to the formula

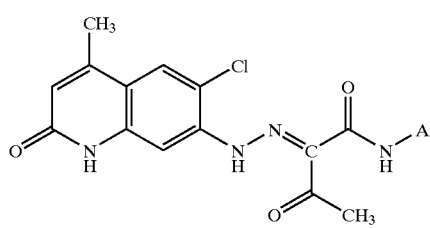

(1)

wherein

Ar is a radical of the formula

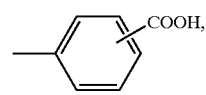

(2a)

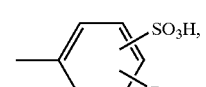

(2b)

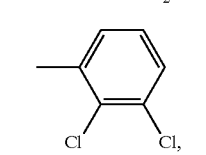

(2c)

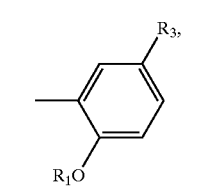

(2d)

-continued

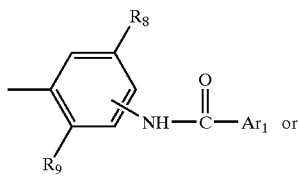
(2e)

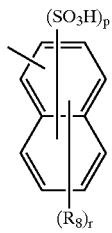
(2f)

wherein $R_1$ is $C_1$–$C_4$alkyl, $R_2$ and $R_3$ are each independently of the other hydrogen, halogen, $C_1$–$C_4$alkyl, carboxy, sulfo, cyano, $C_1$–$C_4$alkoxycarbonyl, $C_1$–$C_4$alkylcarbonyl, $C_1$–$C_4$alkanoylamino, benzoylamino that is unsubstituted or substituted in the phenyl ring by halogen, nitro, $C_1$–$C_4$alkyl or by $C_1$–$C_4$alkoxy; carbamoyl, N-$C_1$–$C_4$alkylaminocarbonyl, N-arylaminocarbonyl that is unsubstituted or substituted in the aryl moiety by halogen, nitro, $C_1$–$C_4$alkyl or by $C_1$–$C_4$alkoxy; N,N-di-$C_1$–$C_4$alkylaminocarbonyl, $C_1$–$C_4$alkoxysulfonyl, $C_1$–$C_4$alkylsulfonyl, sulfamoyl, N-$C_1$–$C_4$-alkylaminosulfonyl, N-arylaminosulfonyl that is unsubstituted or substituted in the aryl moiety by halogen, nitro, $C_1$–$C_4$alkyl or by $C_1$–$C_4$alkoxy; or N,N-di-$C_1$–$C_4$ alkylaminosulfonyl, wherein carboxy and sulfo are in the form of the free acid or in salt form, $R_8$ and $R_9$ are each independently of the other hydrogen, halogen, $C_1$–$C_4$alkyl, $C_1$–$C_4$alkoxy, carboxy, sulfo, cyano, $C_1$–$C_4$alkoxycarbonyl, $C_1$–$C_4$alkylcarbonyl, $C_1$–$C_4$alkanoylamino, benzoylamino that is unsubstituted or substituted in the phenyl ring by halogen, nitro, $C_1$–$C_4$alkyl or by $C_1$–$C_4$alkoxy; carbamoyl, N-$C_1$–$C_4$alkylaminocarbonyl, N-arylaminocarbonyl that is unsubstituted or substituted in the aryl moiety by halogen, nitro, $C_1$–$C_4$alkyl or by $C_1$–$C_4$alkoxy; N,N-di-$C_1$–$C_4$alkylaminocarbonyl, $C_1$–$C_4$alkoxysulfonyl, $C_1$–$C_4$alkylsulfonyl, sulfamoyl, N-$C_1$–$C_4$alkylaminosulfonyl, N-arylaminosulfonyl that is unsubstituted or substituted in the aryl moiety by halogen, nitro, $C_1$–$C_4$alkyl or by $C_1$–$C_4$alkoxy; or N,N-di-$C_1$–$C_4$alkylaminosulfonyl, wherein carboxy and sulfo are in the form of the free acid or in salt form, $Ar_1$ is an aryl radical, p is a number 0, 1 or 2, and r is a number 0, 1 or 2, wherein $(R_8)_r$ in formula (2f) denotes r identical or different radicals $R_8$.

2. A monoazoquinolone pigment according to claim 1 which, in one of the tautomeric forms thereof, corresponds to the formula

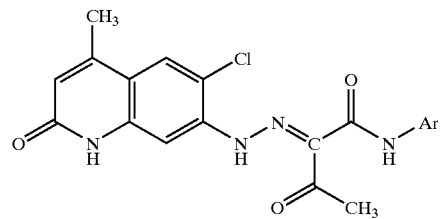
(1)

wherein
Ar is a radical of the formula

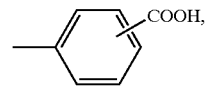
(2a)

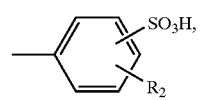
(2b)

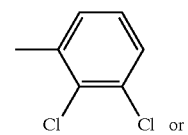
(2c)

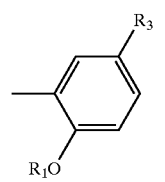
(2d)

wherein
$R_1$ is $C_1$–$C_4$alkyl and
$R_2$ and $R_3$ are each independently of the other hydrogen, halogen, $C_1$–$C_4$alkyl, carboxy, sulfo, cyano, $C_1$–$C_4$alkoxycarbonyl, $C_1$–$C_4$alkylcarbonyl, $C_1$–$C_4$alkanoylamino, benzoylamino that is unsubstituted or substituted in the phenyl ring by halogen, nitro, $C_1$–$C_4$alkyl or by $C_1$–$C_4$alkoxy; carbamoyl, N-$C_1$–$C_4$alkylaminocarbonyl, N-arylaminocarbonyl that is unsubstituted or substituted in the aryl moiety by halogen, nitro, $C_1$–$C_4$alkyl or by $C_1$–$C_4$alkoxy; N,N-di-$C_1$–$C_4$alkylaminocarbonyl, $C_1$–$C_4$alkoxysulfonyl, $C_1$–$C_4$alkylsulfonyl, sulfamoyl, N-$C_1$–$C_4$alkylaminosulfonyl, N-arylaminosulfonyl that is unsubstituted or substituted in the aryl moiety by halogen, nitro, $C_1$–$C_4$alkyl or by $C_1$–$C_4$alkoxy; or N,N-di-$C_1$–$C_4$alkylaminosulfonyl, wherein carboxy and sulfo are in the form of the free acid or in salt form.

3. A monoazoquinolone pigment according to claim 1, wherein $R_1$ is methyl or ethyl.

4. A monoazoquinolone pigment according to claim 1, wherein $R_1$ is methyl.

5. A monoazoquinolone pigment according to claim 1, wherein $R_1$ is hydrogen, halogen, $C_1$–$C_4$alkyl, $C_1$–$C_4$alkanoylamino, benzoylamino that is unsubstituted or substituted in the phenyl ring by halogen, nitro, $C_1$–$C_4$alkyl or by $C_1$–$C_4$alkoxy.

6. A monoazoquinolone pigment according to claim 1, wherein $R_2$ is hydrogen.

7. A monoazoquinolone pigment according to claim 1, wherein $R_3$ is hydrogen, halogen, $C_1$–$C_4$alkyl, carboxy, sulfo, cyano, $C_1$–$C_4$alkoxycarbonyl or carbamoyl.

8. A monoazoquinolone pigment according to claim 1, wherein $R_3$ is hydrogen, chlorine, methyl, carboxy, sulfo, methoxycarbonyl or carbamoyl.

9. A monoazoquinolone pigment according to claims 1, wherein $R_3$ is carboxy, sulfo or carbamoyl.

10. A monozaoquinolone pigment according to claim 1, wherein $R_1$ is methyl and $R_3$ is hydrogen, chlorine, methyl, carboxy, sulfo or methoxycarbonyl, especially carboxy, sulfo or carbamoyl.

11. A process for the preparation of a monoazoquinolone pigment of formula (1) according to claim 1, which process comprises diazotising a compound of the formula

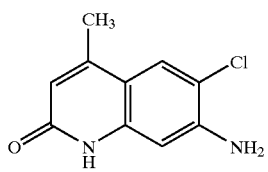
(3)

and coupling it to a compound of the formula

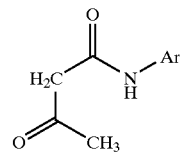
(4)

wherein Ar is as defined in claim 1.

12. A process for coloring high molecular weight material comprising incorporating a monoazoquinolone pigment according to claim 1 said high molecular weight material.

13. A process according to claim 12 wherein the high molecular weight material is in the form of a plastics, a surface coatings or printing inks.

14. A process for the production of color filters comprising adding monoazoquinolone pigment according to claim 1 as a colorant to a suitable substrate.

* * * * *

UNITED STATES PATENT AND TRADEMARK OFFICE
CERTIFICATE OF CORRECTION

PATENT NO. : 6,756,487 B2
DATED : June 29, 2004
INVENTOR(S) : Johannes Benkhoff et al.

It is certified that error appears in the above-identified patent and that said Letters Patent is hereby corrected as shown below:

<u>Title page,</u>
Item [30], should read:
-- [30]      Foreign Application Priority Data
    23 Oct 2000      [CH]      2070/00 --.

Signed and Sealed this

Seventh Day of December, 2004

JON W. DUDAS
*Director of the United States Patent and Trademark Office*